(12) United States Patent
Clarke et al.

(10) Patent No.: US 12,349,663 B2
(45) Date of Patent: Jul. 8, 2025

(54) ADJUSTER ARRANGEMENT FOR SALIVA LICK FEEDER

(71) Applicant: UTF Australia Pty Ltd, Goomalling (AU)

(72) Inventors: Ben Clarke, Goomalling (AU); Bruce Clarke, Goomalling (AU)

(73) Assignee: UTF Australia Pty Ltd, Goomalling (AU)

( * ) Notice: Subject to any disclaimer, the term of this patent is extended or adjusted under 35 U.S.C. 154(b) by 0 days.

(21) Appl. No.: 18/287,384

(22) PCT Filed: Aug. 16, 2022

(86) PCT No.: PCT/AU2022/050904
§ 371 (c)(1),
(2) Date: Oct. 18, 2023

(87) PCT Pub. No.: WO2023/183960
PCT Pub. Date: Oct. 5, 2023

(65) Prior Publication Data
US 2024/0196859 A1    Jun. 20, 2024

(30) Foreign Application Priority Data

Mar. 30, 2022   (AU) ................................ 2022900805

(51) Int. Cl.
*A01K 5/02*    (2006.01)

(52) U.S. Cl.
CPC .................. *A01K 5/0225* (2013.01)

(58) Field of Classification Search
CPC ........ A01K 5/0233; A01K 5/0225; F16B 7/06
See application file for complete search history.

(56) References Cited

U.S. PATENT DOCUMENTS

| | | | | |
|---|---|---|---|---|
| 2,520,555 A | * | 8/1950 | Major | A01K 5/0266 |
| | | | | 119/58 |
| 2,543,916 A | * | 3/1951 | Lewis | A01K 39/012 |
| | | | | 119/53.5 |
| 2,709,988 A | * | 6/1955 | Hatcher | A01K 5/01 |
| | | | | 119/62 |
| 3,268,067 A | * | 8/1966 | Prentice | A01K 5/0258 |
| | | | | 198/671 |
| 3,339,529 A | * | 9/1967 | Holste | A23K 40/00 |
| | | | | 119/51.5 |

(Continued)

FOREIGN PATENT DOCUMENTS

| | | | | |
|---|---|---|---|---|
| AU | 2018100484 A4 | | 5/2018 | |
| CN | 113170740 A | * | 7/2021 | ........... A01K 5/0225 |
| KR | 960004108 Y1 | * | 5/1996 | |
| KR | 200198744 Y1 | * | 10/2000 | |

OTHER PUBLICATIONS

"International Search Report"; prepared for application No. PCT/AU2022/050904; authorized officer Colin Fitzgibbon; Sep. 27, 2022; 4 pages.

(Continued)

*Primary Examiner* — Peter M Poon
*Assistant Examiner* — Angelica Alejandra Almeida Bonnin
(74) *Attorney, Agent, or Firm* — Winstead PC

(57) ABSTRACT

The invention relates to an adjuster arrangement for a saliva lick feeder and a saliva lick feeder including an adjuster arrangement.

10 Claims, 5 Drawing Sheets

(56) References Cited

U.S. PATENT DOCUMENTS

| | | | | |
|---|---|---|---|---|
| 3,986,622 | A * | 10/1976 | Vaughan | B63B 27/22 |
| | | | | 198/534 |
| 5,036,798 | A * | 8/1991 | King | A01K 5/0241 |
| | | | | 119/53.5 |
| 5,967,334 | A * | 10/1999 | Jackson | B07B 11/06 |
| | | | | 222/189.02 |
| 2006/0000417 | A1* | 1/2006 | Loewe | A01K 5/0225 |
| | | | | 119/53 |
| 2014/0130746 | A1* | 5/2014 | Kleinsasser | A01K 5/00 |
| | | | | 119/51.5 |
| 2014/0197206 | A1* | 7/2014 | Jansen | A01K 39/012 |
| | | | | 222/505 |
| 2015/0216141 | A1* | 8/2015 | Di Nello | A01K 5/0225 |
| | | | | 119/57.92 |

OTHER PUBLICATIONS

Chatfield, K "UTF Releases New Saliva Lick Feeder", Queensland Country Life, Published Oct. 28, 2021 [retrieved from Internet on Sep. 21, 2022] <URL: https://www.queenslandcountry life.com.au/story /7469977/utf-releases-new-saliva- lick-feeder>.

"UTF Australia Releases a Saliva Lick Feeder with Improved Product Rate Accuracy", Australasian Farmers' & Dealers' Journal, Published Feb. 8, 2022 [retrieved from Internet on Sep. 21, 2022] <URL: https://afdj.com.au/utf-australia-releases-a-saliva-lick-feeder-with-Improved-product-rate-accuracy/>.

* cited by examiner

ADJUSTER ARRANGEMENT FOR SALIVA LICK FEEDER

TECHNICAL FIELD

This invention broadly relates to the field of agriculture and animal husbandry, and more specifically to an adjuster arrangement for a saliva lick feeder and a saliva lick feeder including such an adjuster arrangement.

BACKGROUND ART

The following discussion of the background art is intended to facilitate an understanding of the present invention only. The discussion is not an acknowledgement or admission that any of the material referred to is or was part of the common general knowledge as at the priority date of the application.

Applicant has developed a saliva lick feeder, an example of which is shown in accompanying FIGS. 1 and 2. Such a lick feeder 10' is typically used to provide grain and associated particulate supplements 8 to livestock, such as cattle, sheep and pigs. The lick feeder 10' generally includes a hopper 12 for containing a large amount of the particulate material 8, such as grain. The particulate material 8 is delivered to a trough 14 via a slot defined by an upper and lower adjuster 16 and 18, as shown, which allows control of particulate material delivery by controlling a height and depth of material in the trough 14.

Such saliva lick feeders 10' generally require livestock to utilise saliva to draw grain or feed 8 out from the slot 22 between the upper and lower adjuster plates 16 and 18. The upper adjuster 16 generally regulates or controls the depth of the grain 8 in the trough 14, whilst the lower adjuster 18 controls the width of the grain in the trough 14 available for consumption. As the livestock's tongue goes into the slot 22, the feed grain that sticks to the tongue is the ration the animal can consume. The saliva decreases with progressive licks until the animal is unable to obtain any more feed. Livestock will leave the feeder 10' once they are unable to obtain more feed, enabling other animals to have their turn.

To allow for control and monitoring of animal feeding rates, the two adjusters 16 and 18 are used. The upper adjuster 16 allows the feed being used to be placed into the trough at the desired height. This enables the farmer to dictate the depth of grain the tongue can reach each time. The lower adjuster 18 is used to wipe the feed off the tongue of the animal. The closer it is set to the upper adjuster 16, the more grain will be removed from the tongue as it retracts from the slot 22. In certain circumstances a lower rate may be required or the grain quality may be poor, requiring a higher rate. So-called ad-lib feeding can also be done by moving the lower adjuster 18 or using an ad-lib attachment 18.1 to allow unrestricted access to the slot 22, as shown.

Applicant has identified some shortcomings with their earlier lick feeder design. Rust under the bottom adjuster 18 is a problem as water, saliva and dirt gets trapped between the adjuster 18 or the ad-lib attachment 18.1 and the trough 14. It is also time consuming and onerous to adjust the two adjusters 16 and 18, as it requires tools to loosen and fasten bolts 20. Such bolts 20 also make it difficult to adjust the adjusters 16 and 18 accurately.

In addition, the adjusters 16 and 18 generally require an animal to stand slightly sideways relative to the trough 14 of the feeder 10' in order to better access the slot 22 with a tongue. Upper adjuster 16 also provided some risk to an animal, as placement and positioning thereof provide a possibility of the tongue getting cut. Furthermore, in order to adjust and calibrate the upper and lower adjusters 16 and 18, as desired, the feeder 10' and trough 14 are generally required to be empty an order to allow access to the bolts 20.

The current invention was conceived with these shortcomings in mind.

SUMMARY OF THE INVENTION

The skilled addressee is to appreciate that reference herein to 'grain' is used in a broad sense and generally refers to any suitable particulate material or feed useable for feeding livestock, including associated supplements, and the like.

According to a first aspect of the invention there is provided a saliva lick feeder comprising:
  a hopper for receiving grain therein and configured to feed said grain under the influence of gravity to a trough defined at a bottom portion of said hopper via a slot;
  an adjuster beam suspended along a length of the slot with ends of the beam extending through apertures in either side of said trough; and
  an adjuster arrangement arranged externally on either side of said trough and comprising:
    i) a height turnbuckle fast at one end to the feeder and at the other end to an extending end of the beam; and
    ii) a width turnbuckle fast at one end to the feeder and at the other end to the extending end of the beam;
the turnbuckles suspending the adjuster beam within the trough so that a height and width of the slot are independently adjustable via the respective turnbuckles adjustably positioning said adjuster beam relative to the slot in order to regulate an amount of grain suppliable from the hopper.

The skilled addressee is to appreciate that a turnbuckle generally comprises an adjustable device consisting of three primary components, being a threaded body, a right-hand threaded end fitting, and a left-hand threaded end fitting, said end fittings suitably threaded into the body so that rotation of the body either telescopingly extends or retracts the fittings complementarily and simultaneously from, or into, the body.

In an embodiment, each turnbuckle comprises a ratchet turnbuckle to facilitate securing an adjustment position of the adjuster beam as desired, i.e. to prevent unwanted movement of the adjuster beam.

In an embodiment, the height and width turnbuckles are arranged transverse with respect to each other and diagonally relative to the trough.

In an embodiment, the apertures via which the ends of the beam extend comprise suitably shaped and dimensioned channels to allow movement of the adjuster beam whilst minimising grain passing therethrough.

In an embodiment, the saliva lick feeder comprises a regulator beam arranged within and along a length of the trough below the adjuster beam.

According to a second aspect of the invention there is provided an adjuster arrangement for a saliva lick feeder comprising a hopper for receiving grain therein and configured to feed said grain under the influence of gravity to a trough by means of a slot at a bottom portion of said hopper, the adjuster arrangement comprising:
  an adjuster beam suspended along a length of said slot with ends of the beam extending through apertures in either side of said trough;
  two height turnbuckles each arranged externally on either side of the trough and fast at one end to the feeder and at the other to an extending end of the beam; and two width turnbuckles each arranged externally on either side of the trough and fast at one end to the feeder and at the other to the other extending end of the beam;

the turnbuckles suspending the adjuster beam within the trough so that a height and width of the slot are independently adjustable via the respective turnbuckles adjustably positioning said adjuster beam relative to the slot in order to regulate an amount of grain suppliable from the hopper.

In an embodiment, each turnbuckle comprises a ratchet turnbuckle to facilitate securing an adjustment position of the adjuster beam as desired, i.e. to prevent unwanted movement of the adjuster beam.

In an embodiment, the height and width turnbuckles are arranged transverse with respect to each other and diagonally relative to the trough.

In an embodiment, the apertures via which the ends of the beam extend comprise suitably dimensioned channels to allow movement of the adjuster beam whilst minimising grain passing therethrough.

According to a further aspect of the invention there is provided an adjuster arrangement for a saliva lick feeder and an associated saliva lick feeder, substantially as herein described and/or illustrated.

BRIEF DESCRIPTION OF THE DRAWINGS

The description will be made with reference to the accompanying drawings in which.

DETAILED DESCRIPTION OF EMBODIMENTS

Figure 1:
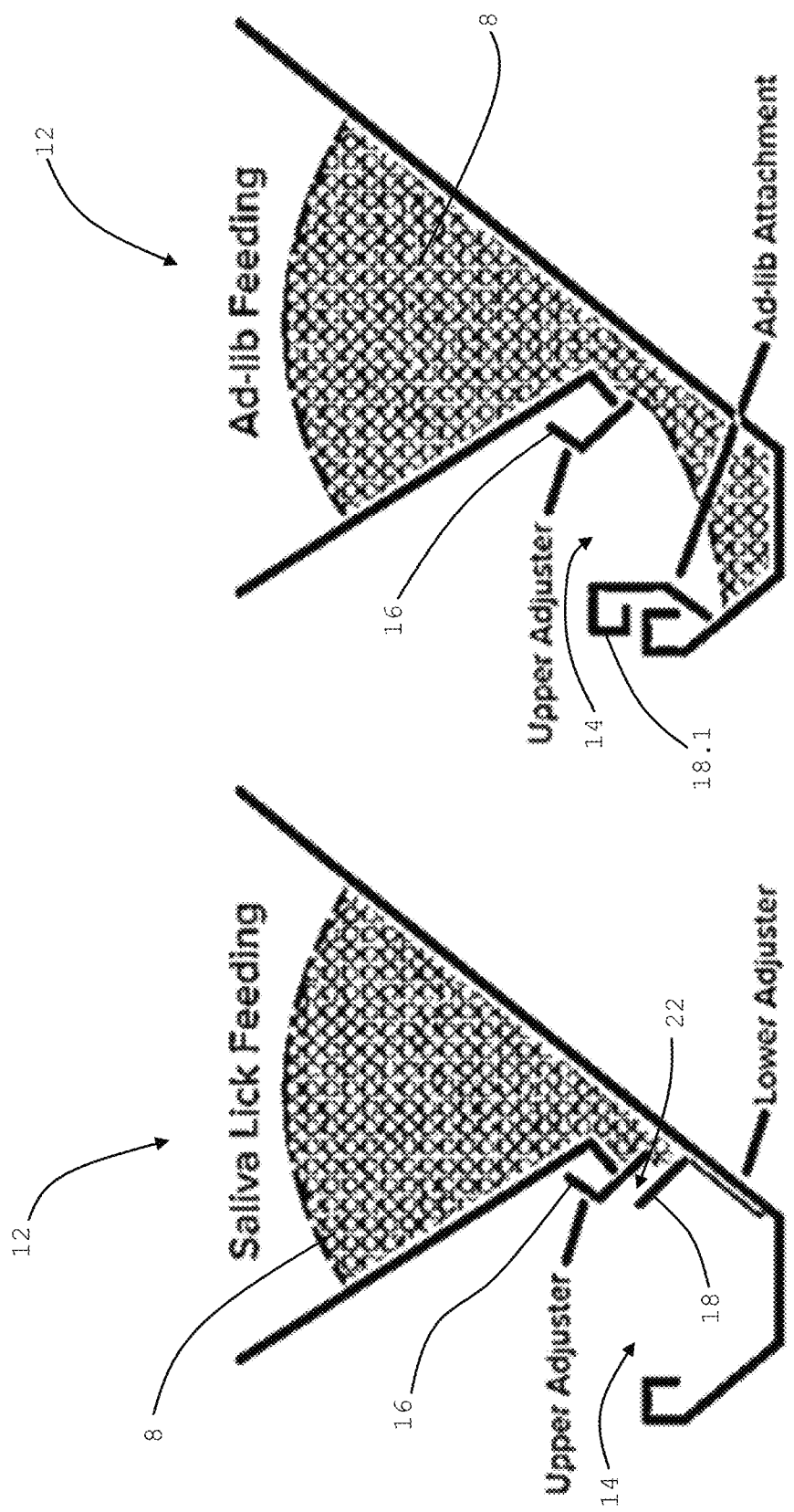
FIGS. 1 and 2 are diagrammatic representations of Applicant's prior art saliva lick feeders, including operation of upper and lower adjusters.
Figure 2:
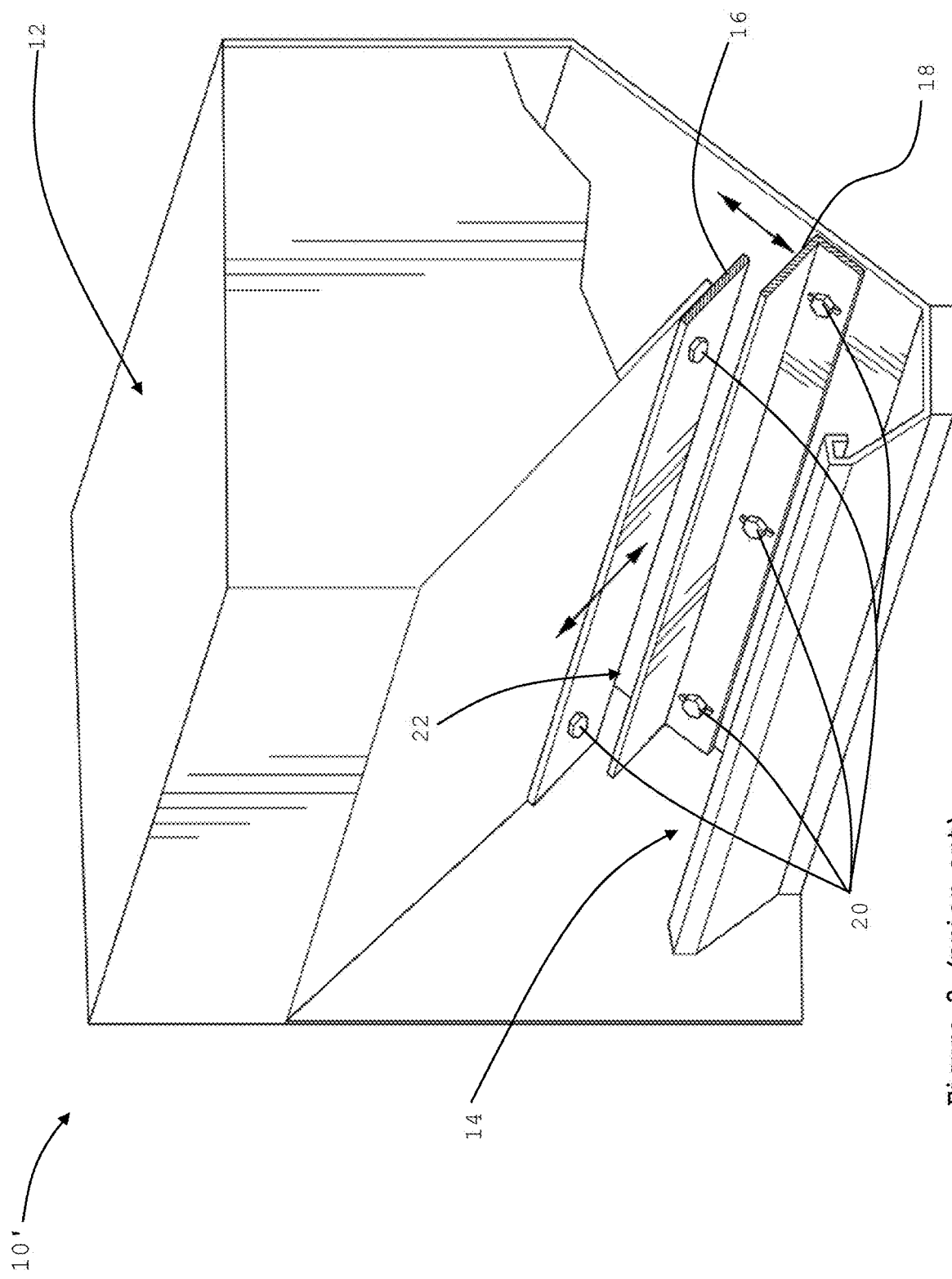

Further features of the present invention are more fully described in the following description of several non-limiting embodiments thereof. This description is included solely for the purposes of exemplifying the present invention to the skilled addressee. It should not be understood as a restriction on the broad summary, disclosure or description of the invention as set out above.

In the figures, incorporated to illustrate features of the example embodiment or embodiments, like reference numerals are used to identify like parts throughout. Additionally, features, mechanisms and aspects well-known and understood in the art will not be described in detail, as such features, mechanisms and aspects will be within the understanding of the skilled addressee.

Figure 3:
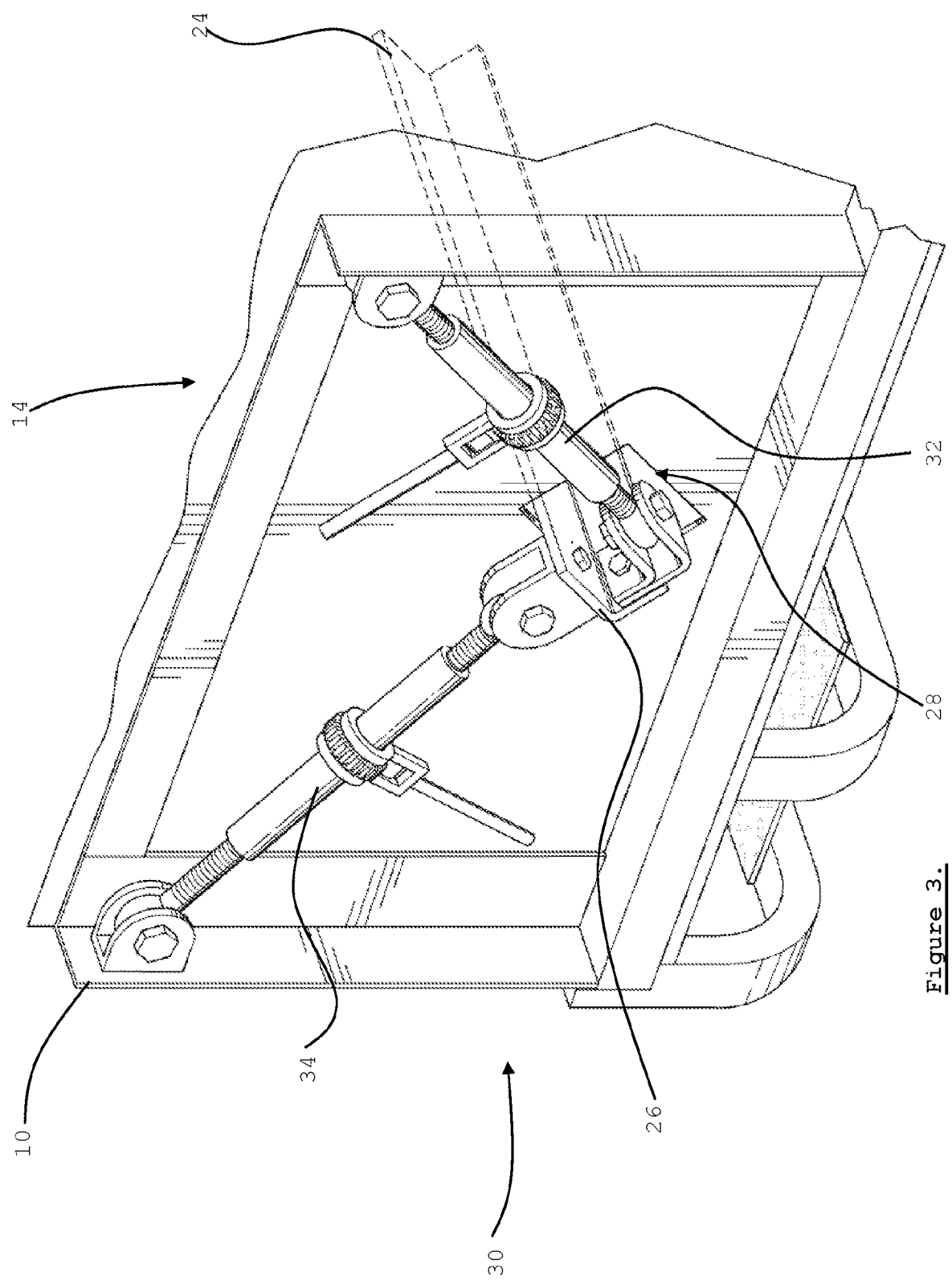
FIG. 3 is diagrammatic perspective-view representation of an example of an adjuster arrangement for a saliva lick feeder, in accordance with an aspect of the present invention.
Figure 4:
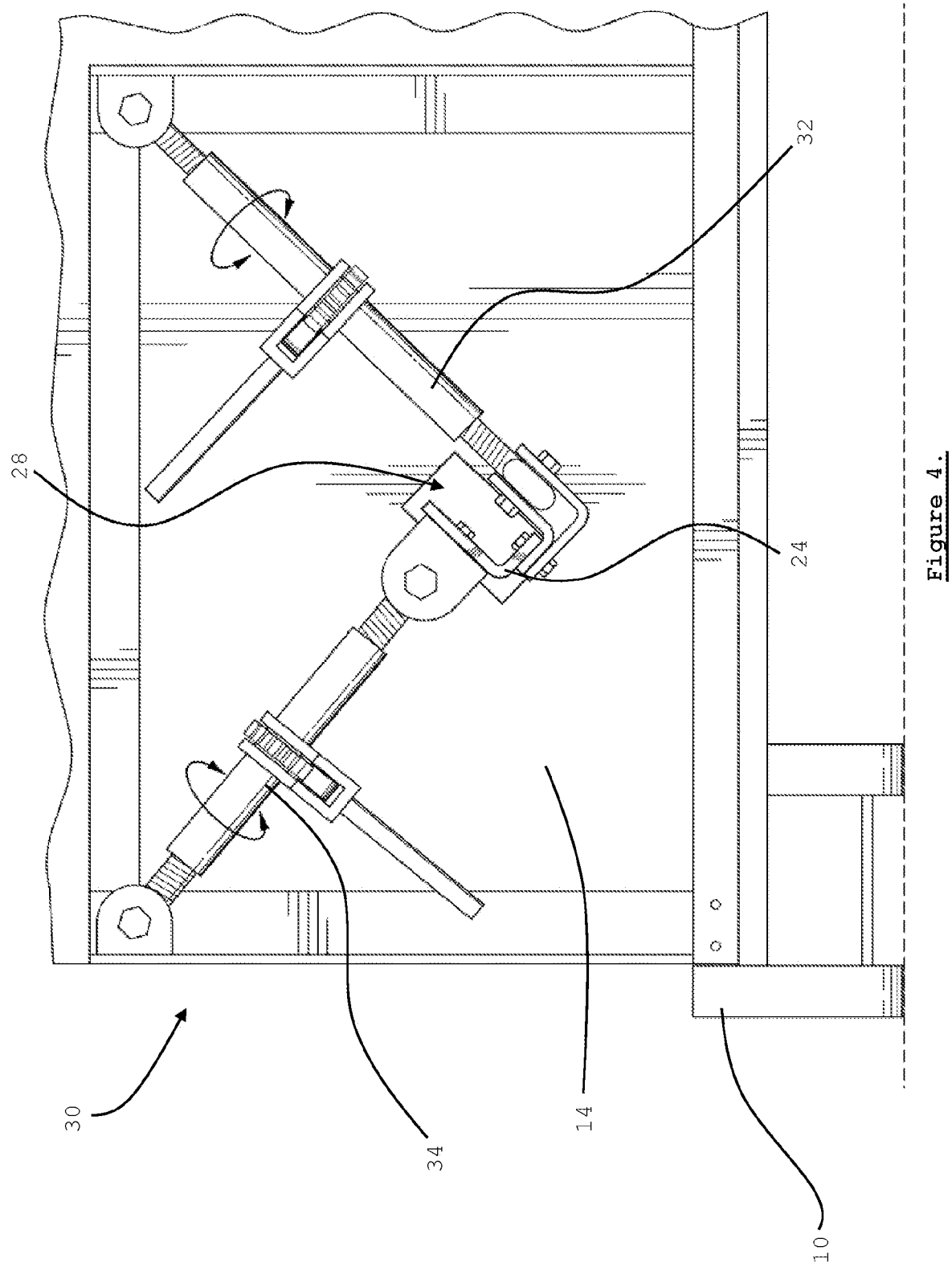
FIG. 4 is a diagrammatic external side-view representation of the adjuster arrangement for a saliva lick feeder of FIG. 3.
Figure 5:
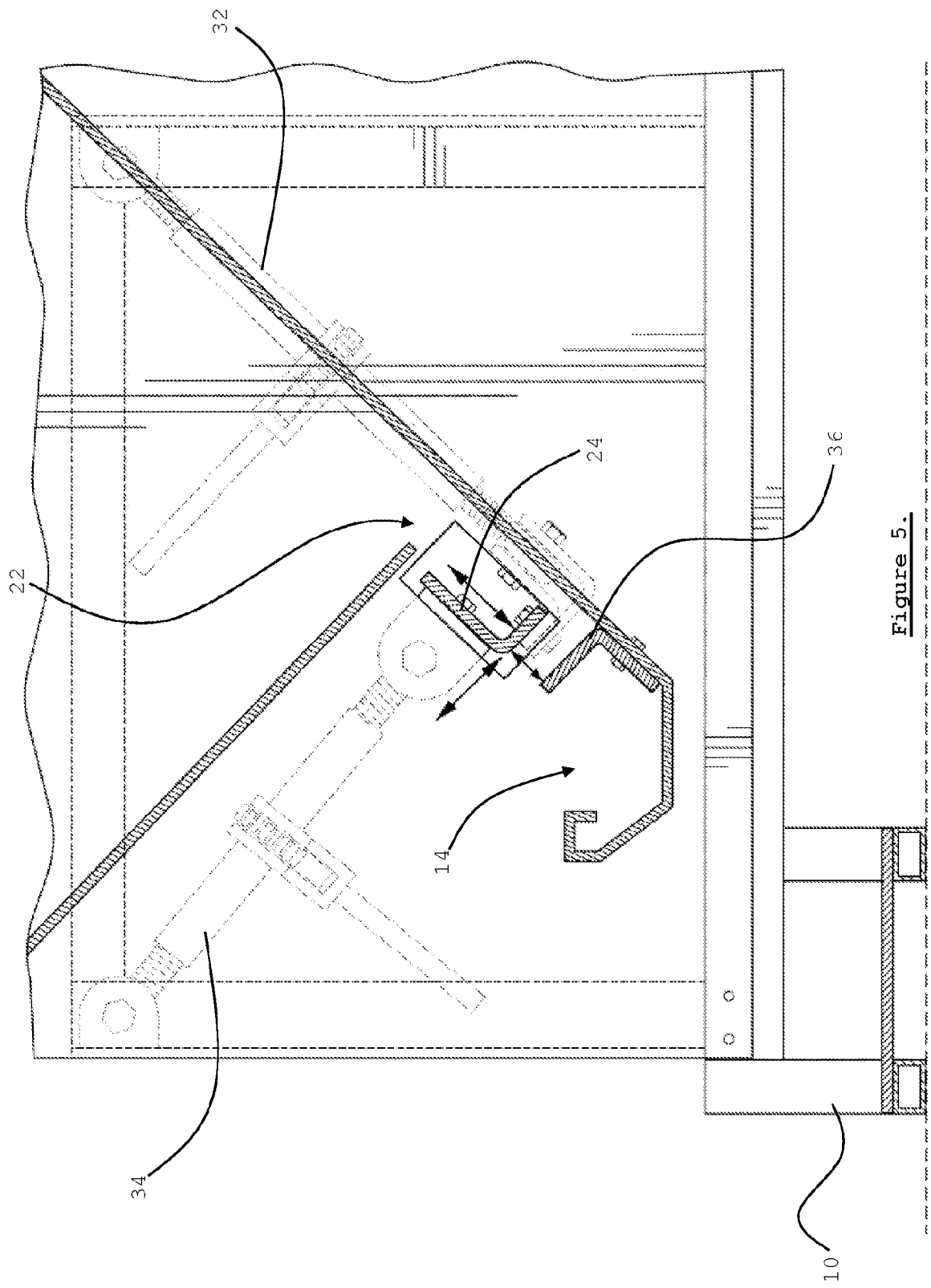
FIG. 5 is a diagrammatic internal side-sectional representation of the adjuster arrangement for a saliva lick feeder of FIG. 3.

With reference now to the accompanying figures, the present invention broadly provides for a saliva lick feeder 10 including an adjuster arrangement 30, as well as such an adjuster arrangement 30 for a saliva lick feeder, described in more detail below. FIGS. 3 to 5 show a single adjuster arrangement 30 on one side of a saliva lick feeder, but the skilled addressee will appreciate that a saliva lick feeder will generally include such an arrangement at either side thereof, i.e. one adjuster arrangement 30 at each side of the trough.

A saliva lick feeder 10 in accordance with aspects of the present invention generally comprises a hopper 12 for receiving grain 8 therein and is generally configured to feed said grain 8 under the influence of gravity to a trough 14 by means of a slot 22 at a bottom portion of the hopper 12, as shown. The feeder 10 further includes an adjuster beam 24 which is operatively suspended along a length of said slot 22 with ends 26 of the beam 24 extending through apertures 28 defined in either side of the trough 14.

Feeder 10 also includes an adjuster arrangement 30 which is arranged externally on either side of the trough 14, as shown, and comprises a height turnbuckle 32 fast at one end to the feeder 10 and at the other end to one extending end 26 of the beam 24, as well as a width turnbuckle 34 fast at one end to the feeder 10 and at the other end to the same one extending end 26 of the beam 24, as shown. As will be appreciated, the feeder 10 generally includes an adjuster arrangement 30 at either end of the trough to allow for complementary adjustment of the adjuster beam 24 along a length of the trough 14.

In this manner, the single adjuster beam 24 is suspended within the trough 14 and a height and width of the slot 22 are independently adjustable via the respective turnbuckles 32 and 34 that adjustably position the suspended adjuster beam 24 relative to the slot 22 in order to regulate an amount of grain suppliable from the hopper 12 to an animal at the trough 14, as required.

In an embodiment, as shown in FIG. 5, the saliva lick feeder 10 includes a regulator beam 36 which is typically arranged within and along a length of the trough 14 below the adjuster beam 24 as shown. This regulator beam 36 may be useful in regulating or facilitating an amount of grain suppliable from the hopper 12 in concert with the adjuster beam 24. Regulator beam 36 is generally fast within the trough 14 in a manner which seals against the ingress of liquid and/or dirt between a trough surface and the regulator beam 36.

In one embodiment, each turnbuckle 32 and 34 may comprise a ratchet turnbuckle to facilitate securing an adjustment position of the adjuster beam 24 as desired, i.e. to prevent unwanted movement of the adjuster beam 24.

As shown, the height and width turnbuckles 32 and 34 are typically arranged transverse with respect to each other and diagonally relative to the trough 14, but variations hereon are possible and within the scope of the present invention. For example, in one embodiment, the respective turnbuckles 32 and 34 may be arranged substantially parallel with sides of the trough 14, or the like.

The apertures 28 via which the ends 26 of the beam 24 extend typically comprise suitably dimensioned channels 28 to allow movement of the adjuster beam 24 whilst minimising grain passing therethrough. Suitable seals (not shown) may also be included within such apertures 28 to prevent egress of grain therefrom, e.g. rubber seals, bushings, or the like.

In this manner, by using a single adjuster beam 24, turnbuckles 32 and 34 can be adjusted as desired in order to position the beam 24 relative to the slot 22 in order to regulate a rate at which grain 8 is provided by, or is accessible from, the feeder 10.

Applicant believes it particularly advantageous that the present invention provides for adjuster arrangement 30 that only requires a single adjuster beam 24 whereby a height and width of slot 22 are adjustable. Arrangement 30 does not require moving separate pieces of metal, i.e. adjusters 16 and 18 of the prior art, that need to be clamped to the trough 14 to adjust a lick feeder, as is conventionally done with separate adjusters 16 and 18. Adjuster arraignment 30 also provides longer life to the feeder 10, as the suspended beam 24 does not trap moisture that can rust the feeder 10.

Additionally, arrangement 30 allows the feeder to be adjusted whilst full, as the turnbuckles 32 and 34 are easily accessible external to the feeder 10, typically from the sides of the trough 14. Such adjustment can also be performed without tools, meaning less time is wasted removing and cleaning separate adjusters while the trough 14 is empty to allow access to bolts 20. Turnbuckles 32 and 34 further allow for precise and accurate positioning or shifting of the adjuster beam 24, which makes it much easier to achieve accurate settings for the feeder 10.

Use of the adjuster arrangement 30 further allows an animal to stand straighter relative to the trough when feeding, meaning more animals can be at the feeder at the same time which saves time and money. Additionally, the single suspended adjuster beam 24 minimises the risk of harm, such as cuts, to an animal's tongue while feeding.

Additionally, in embodiments where an ad-lib feeder attachment 18.1 or a bottom adjuster 18 is used or required, it can be fixed in place within the trough and sealed so that no moisture or dirt can get under it, minimising rust and contamination, whilst a height and width of the slot 22 are independently adjustable via single adjuster beam 24.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth. In the example embodiments, well-known processes, well-known device structures, and well-known technologies are not described in detail, as such will be readily understood by the skilled addressee.

The use of the terms "a", "an", "said", "the", and/or similar referents in the context of describing various embodiments (especially in the context of the claimed subject matter) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. As used herein, the term "and/or" includes any and all combinations of one or more of the associated listed items. No language in the specification should be construed as indicating any non-claimed subject matter as essential to the practice of the claimed subject matter.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

It is to be appreciated that reference to "one example" or "an example" of the invention, or similar exemplary language (e.g., "such as") herein, is not made in an exclusive sense. Accordingly, one example may exemplify certain aspects of the invention, whilst other aspects are exemplified in a different example. These examples are intended to assist the skilled person in performing the invention and are not intended to limit the overall scope of the invention in any way unless the context clearly indicates otherwise. Variations (e.g. modifications and/or enhancements) of one or more embodiments described herein might become apparent to those of ordinary skill in the art upon reading this application. The inventor(s) expects skilled artisans to employ such variations as appropriate, and the inventor(s) intends for the claimed subject matter to be practiced other than as specifically described herein.

The invention claimed is:

1. A saliva lick feeder comprising:
a hopper for receiving grain therein and configured to feed said grain under the influence of gravity to a trough defined at a bottom portion of said hopper via a slot;
an adjuster beam suspended along a length of the slot with ends of the adjuster beam extending through apertures in either side of said trough; and
an adjuster arrangement arranged externally on either side of said trough and comprising:
i) a height turnbuckle fast at one end to the feeder and at another end to an extending end of the adjuster beam; and
ii) a width turnbuckle fast at one end to the feeder and at another end to the extending end of the adjuster beam;
wherein the height and width turnbuckles suspend the adjuster beam within the trough so that a height and width of the slot are independently adjustable via the respective turnbuckles adjustably positioning said adjuster beam relative to the slot in order to regulate an amount of grain suppliable from the hopper, wherein the saliva lick feeder further comprises a regulator beam arranged within and along a length of the trough below the adjuster beam to regulate grain supplied from the hopper, said regulator beam sealingly fast within the trough to seal against an ingress of liquid and/or dirt between a trough surface and the regulator beam.

2. The saliva lick feeder of claim 1, wherein each turnbuckle comprises a ratchet turnbuckle to facilitate securing an adjustment position of the adjuster beam as to impede unwanted movement of the adjuster beam.

3. The saliva lick feeder of claim 1, wherein the height and width turnbuckles are arranged transverse with respect to each other and diagonally relative to the trough.

4. The saliva lick feeder of claim 1, wherein the apertures via which the ends of the adjuster beam extend comprise suitably shaped and dimensioned channels to allow movement of the adjuster beam whilst minimising grain passing therethrough.

5. The saliva lick feeder of claim 4, wherein the apertures via which the ends of the adjuster beam extend include a seal to impede egress of grain from the trough whilst allowing adjustment of the adjuster beam.

6. An adjuster arrangement for a saliva lick feeder comprising a hopper for receiving grain therein and configured to feed said grain under the influence of gravity to a trough by means of a slot at a bottom portion of said hopper, the adjuster arrangement comprising:

an adjuster beam suspended along a length of said slot with ends of the adjuster beam extending through apertures in either side of said trough;

a regulator beam arranged within and along a length of the trough below the adjuster beam to regulate grain supplied from the hopper, said regulator beam sealingly fast within the trough to seal against an ingress of liquid and/or dirt between a trough surface and the regulator beam;

two height turnbuckles each arranged externally on either side of the trough and fast at one end to the feeder and at another end to an extending end of the adjuster beam; and two width turnbuckles each arranged externally on either side of the trough and fast at one end to the feeder and at another end to the extending end of the adjuster beam;

wherein the height and width turnbuckles suspend the adjuster beam within the trough so that a height and width of the slot are independently adjustable via the respective turnbuckles adjustably positioning said adjuster beam relative to the slot in order to regulate an amount of grain suppliable from the hopper.

7. The adjuster arrangement of claim 6, wherein each turnbuckle comprises a ratchet turnbuckle to facilitate securing an adjustment position of the adjuster beam to impede unwanted movement of the adjuster beam.

8. The adjuster arrangement of claim 6, wherein the height and width turnbuckles are arranged transverse with respect to each other and diagonally relative to the trough.

9. The adjuster arrangement of claim 6, wherein the apertures via which the ends of the adjuster beam extend comprise suitably dimensioned channels to allow movement of the adjuster beam whilst minimising grain passing therethrough.

10. The adjuster arrangement of claim 9, wherein the apertures via which the ends of the adjuster beam extend include a seal to impede egress of grain from the trough whilst allowing adjustment of the adjuster beam.

* * * * *